(12) United States Patent
Johanson et al.

(10) Patent No.: US 11,791,065 B2
(45) Date of Patent: Oct. 17, 2023

(54) MULTI-LAYER RADIAL WATER BARRIER FOR RAPID MANUFACTURE

(71) Applicant: NEXANS, Courbevoie (FR)

(72) Inventors: Audun Johanson, Oslo (NO); Robin Sangar, Drobak (NO)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 17/478,396

(22) Filed: Sep. 17, 2021

(65) Prior Publication Data
US 2022/0115165 A1    Apr. 14, 2022

(30) Foreign Application Priority Data

Sep. 18, 2020    (EP) ..................... 20306060

(51) Int. Cl.
| | | |
|---|---|---|
| H01B 9/02 | (2006.01) | |
| H01B 7/02 | (2006.01) | |
| H01B 7/29 | (2006.01) | |
| H01B 13/00 | (2006.01) | |
| H01B 13/26 | (2006.01) | |

(52) U.S. Cl.
CPC .............. H01B 9/023 (2013.01); H01B 7/02 (2013.01); H01B 7/292 (2013.01); H01B 13/0016 (2013.01); H01B 13/26 (2013.01)

(58) Field of Classification Search
CPC . H01B 7/02; H01B 7/292; H01B 7/04; H01B 7/06; H01B 7/08; H01B 7/14; H01B 7/22; H01B 7/282; H01B 9/023; H01B 13/22; H01B 13/26; H01B 13/0016; H01B 7/00

USPC .. 174/102 R, 102 SC, 105 SC, 106 SC, 107, 174/133 R, 120 R, 120 SC
See application file for complete search history.

(56) References Cited

U.S. PATENT DOCUMENTS

| | | | | |
|---|---|---|---|---|
| 3,405,228 A | * | 10/1968 | Polizzano | H01B 9/022 428/685 |
| 4,360,704 A | * | 11/1982 | Madry | H01B 9/02 174/23 R |
| 4,725,693 A | * | 2/1988 | Hirsch | B32B 7/14 174/106 SC |
| 5,001,303 A | * | 3/1991 | Coleman | H01B 7/20 174/102 R |
| 5,350,885 A | * | 9/1994 | Falciglia | H01B 13/341 174/109 |
| 6,127,632 A | * | 10/2000 | Oswald | H01B 7/046 174/121 R |
| 6,486,395 B1 | * | 11/2002 | Temblador | H01B 9/02 174/102 R |
| 7,880,089 B1 | * | 2/2011 | Herrin | H01B 9/028 174/113 R |
| 11,101,056 B1 | * | 8/2021 | Lafreniere | H01B 7/226 |
| 2002/0003046 A1 | | 1/2002 | Clouet et al. | |

(Continued)

FOREIGN PATENT DOCUMENTS

WO    WO-2017080621 A1 *    5/2017    .............. H01B 7/04

OTHER PUBLICATIONS

International Search Report dated Mar. 5, 2021.

*Primary Examiner* — William H. Mayo, III
(74) *Attorney, Agent, or Firm* — Sofer & Haroun, LLP

(57) ABSTRACT

A power cable has a cable core with at least one conductor with an insulating system and a water barrier surrounding the cable core. The water barrier has a helically wound strength bearing layer interconnected by a low melting point material.

19 Claims, 4 Drawing Sheets

(56) References Cited

U.S. PATENT DOCUMENTS

| | | | |
|---|---|---|---|
| 2002/0044841 A1* | 4/2002 | Taylor | E02D 29/0241 |
| | | | 405/259.1 |
| 2011/0011614 A1* | 1/2011 | Brown, Jr. | H01B 7/2806 |
| | | | 174/107 |
| 2011/0253414 A1* | 10/2011 | Dewberry | H01B 9/02 |
| | | | 174/102 R |
| 2011/0278062 A1* | 11/2011 | Varkey | H01B 13/141 |
| | | | 174/70 R |
| 2014/0060884 A1* | 3/2014 | Patel | H01B 13/062 |
| | | | 174/102 A |
| 2018/0330846 A1 | 11/2018 | Spa | |
| 2020/0126693 A1* | 4/2020 | Farkas | H01B 11/1091 |
| 2020/0234845 A1 | 7/2020 | Zhao et al. | |

* cited by examiner

Prior art 1
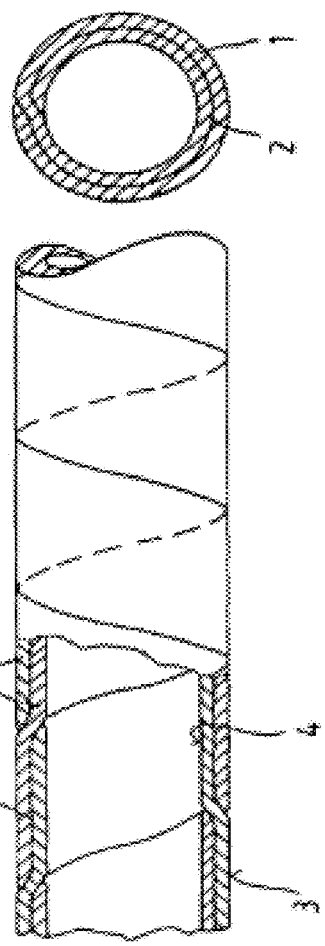
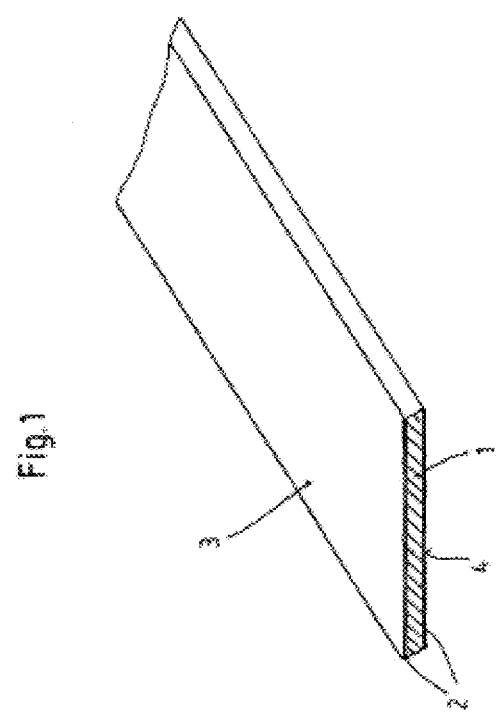

Prior art 2

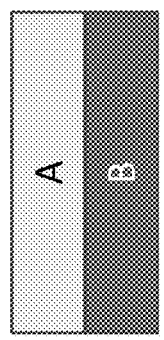
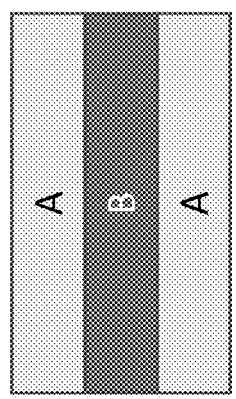
Fig. 7

MULTI-LAYER RADIAL WATER BARRIER FOR RAPID MANUFACTURE

RELATED APPLICATION

This application claims the benefit of priority from European Patent Application No. 20 306 060.3, filed on Sep. 18, 2021, the entirety of which is incorporated by reference.

FIELD OF THE INVENTION

The present invention relates to a multi-layer radial water barrier to prevent water ingress in subsea power cables. Method of applying said multi-layer radial water barrier on a subsea power cable.

BACKGROUND

Subsea power cables require a radial water barrier to prevent water ingress which can cause failure and damage the insulation system of the cable. Conventional cables use extruded lead as radial water barrier. Today lead sheath is used in most subsea cable projects. For subsea use qualified products using copper alloys are known. Subsea cable producers also use wrapped or folded laminates as water barrier, these solutions are however not accepted for all cable designs.

As mentioned above the most used water barrier subsea is lead. Its characteristics makes it useable as water barrier for subsea cables, on the other hand its toxicity and negative environmental effects encourage the industry to find alternative solutions. Lead is a heavy metal with relatively low melting point, 327.5° C., the metal is soft and has a high malleability all features which make the metal applicable as radial water barrier. Lead is however a neurotoxic that has damaging effects in the nervous system and causes neurological disorders. Use of lead in cable design imply upstream effects throughout the supply-chain (mining, processing, melting, casting). Due to the known toxic effects of lead there is a need to reduce or avoid the use of lead and find other barrier materials for use as water barrier under subsea conditions.

For high voltage subsea applications extruded cross-linked polyethylene (XLPE) cables are used. There are two types of extruded XLPE cables, High Voltage Direct Current (HVDC) cables and High Voltage Alternating Current (HVAC) cables, where the main difference is the type of insulation used in the manufacturing of the cables. The insulation system for both HVDC and HVAC cables are typically made of cross-linked polyethylene (XLPE). XLPE is a material with very good mechanical, thermal and electrical properties for this application.

The existing water barrier for land cables are longitudinally welded sheath of aluminium are not suitable for high voltage subsea cables due to poor corrosion properties.

There exists a need in the art for an alternative water barrier for application in subsea high voltage systems.

PRIOR ART

In reference to FIGS. 1 to 5, EP0576733 (A1)/U.S. Pat. No. 5,553,640 (A) concerns a multi-layer metal tube consisting of a flat steel band having a soldering layer connected to at least one side of the steel band. The soldering layer consists of a copper alloy having a melting point below 1020° C. The tube is produced by deforming the flat steel band into a tubular shape by winding or cylindrically rolling and by subsequently soldering the steel band to form the multi-layer metal tube. The soldering step prevents leaks as well as corrosion. In the corresponding method for manufacturing the multi-layer tubes the steel band in a first step is electrolytically degreased and activated in a nickel flash bath or in a copper pickling bath. Subsequently, the steel band is coated with the copper alloy which contains tin, zinc, or silver in order to reduce the melting point. After completion of the winding step or rolling step, the multi-layer tube can be coated with an additional corrosion-preventing layer.

EP1469486 (A1) relates to a copper clad aluminum strip capable of being formed into a tube and used as both the inner and outer conductors of a coaxial cable. The copper clad aluminum strip has a first edge, a second edge, and a middle portion disposed between the first edge and the second edge and being clad with an overlay of copper. More specifically, the middle portion is at least approximately 70% of the width of the copper clad aluminum strip. Therefore, the strip may be folded into a tube and the first and second aluminum edges may be welded together without the copper interfering with the welding process. The resulting tube may be used as both the inner and outer conductors of a coaxial cable.

U.S. Pat. No. 3,405,228 and further patent documents disclose electric cables comprising a metal-metal laminate tape folded longitudinally around a core of conductors. The metal-metal laminate tape of U.S. Pat. No. 3,405,228 consisting of one strength bearing layer (stainless steel) sandwiched between two low melting point layers (copper). Further comprises an insulating jacket containing filler material. The sheath is waterproof.

Other publications in the area are U.S. Pat. No. 2,688,652 disclose moisture-proof metallic sheathing for electrical cables, U.S. Pat. No. 3,405,228 concerns electrical cables shielded with a laminated, metallic sheath which is longitudinally wrapped around the cable and welded. DE 1440008 (A1) and DE 1440017 (A1) also concern laminated metal strips or sheaths welded around cables.

Objective of the Invention

An object of the present inversion is to provide an alternative to lead as a water barrier for subsea cables, particularly high voltage cables.

A further objective is to provide a durable water barrier which can be applied to XLPE cables without the risk of damaging the insulation of said cable.

BRIEF DESCRIPTION OF THE FIGURES

FIGS. 1-5 show aspects of manufacturing of a multi-layer tube wound from a steel band according to the prior art.

FIG. 7 shows cross-sections of examples of multiple prefabricated multilayered metal-metal laminates.

Figure 5:
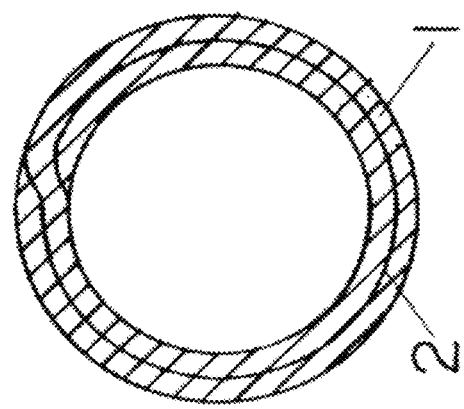
Figure 4:
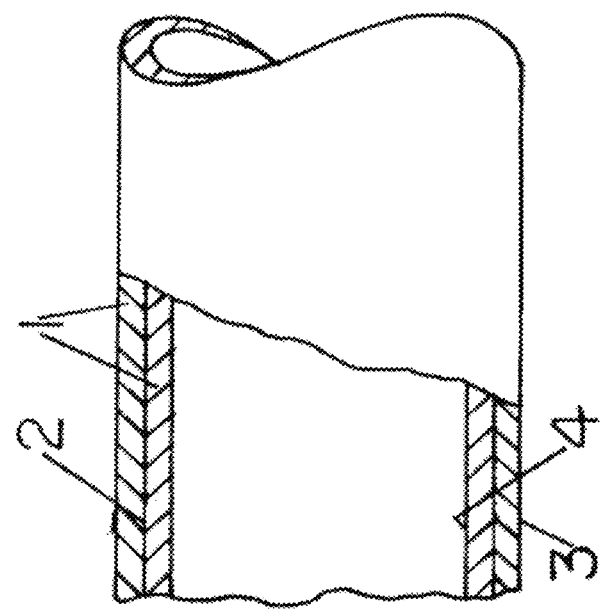
Figure 6:
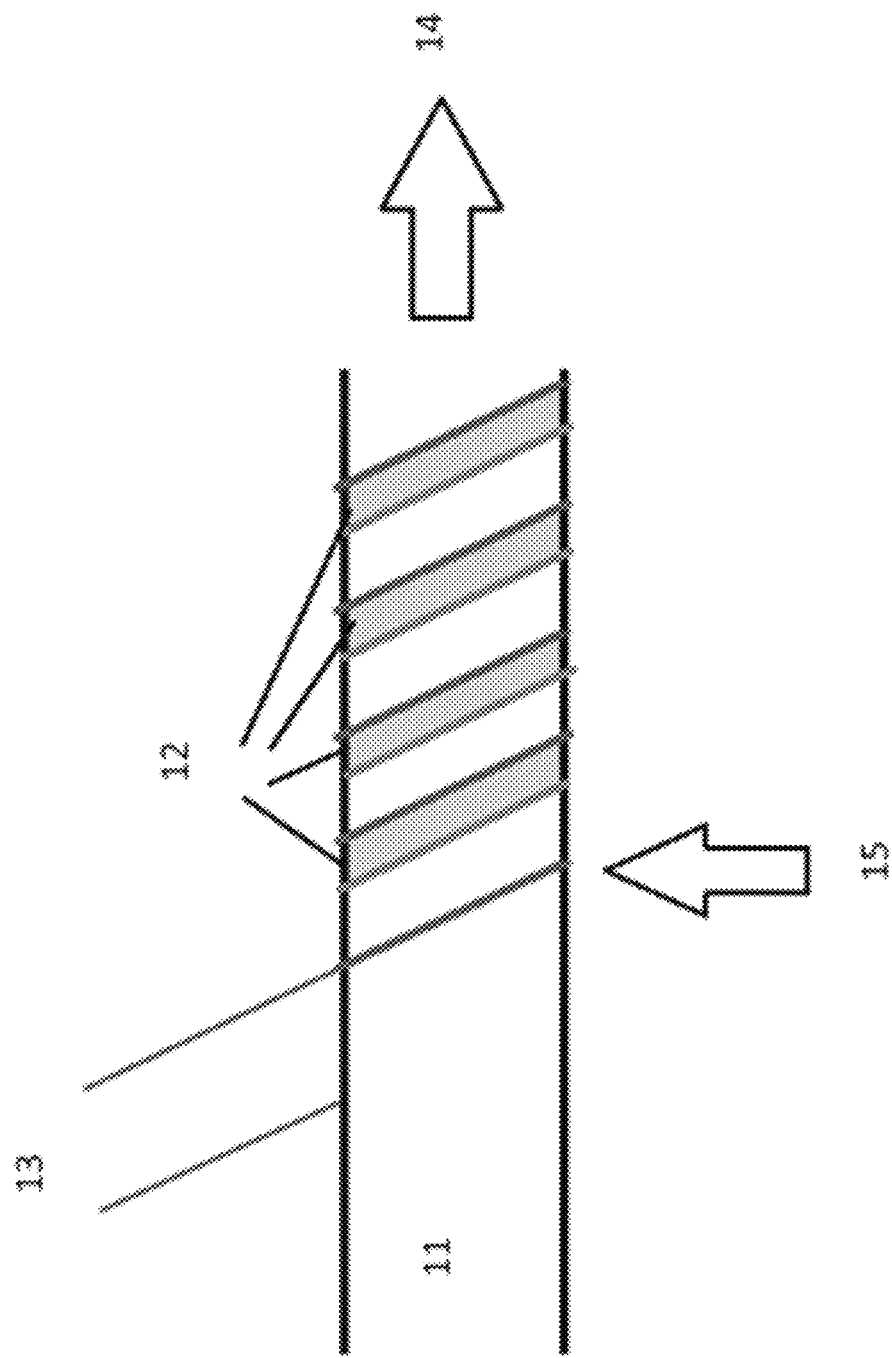
FIG. 6 shows the manufacturing of a cable/cable core where a multi-layer radial water barrier is applied thereon.

The present invention will be described in further detail with reference to the enclosed figures, where FIG. 6 illustrate one embodiment of the present invention.

A person skilled in the art will appreciate that alternative embodiments can be prepared within the scope of the present invention.

DESCRIPTION OF THE INVENTION

One aspect of the present invention relates to a power cable comprising a cable core comprising at least one conductor with an insulating system a water barrier surrounding the cable core, where the water barrier comprises a helically wound strength bearing layer interconnected by a low melting point material.

In one aspect of the invention the helically wound strength bearing layer is soldered or brazed by a low melting point material.

The water barrier is composed of a multilayered tape comprising at least one layer of a low-melting point material and a strength bearing layer. The multilayers tape is composed of a metal-metal laminate tape comprised of one strength bearing layer and one low melting point layer or one strength bearing layer sandwiched between two low melting point layers.

Further, the multilayered tape comprises at least two layers whereof at least one of the layers has a low melting point in the range of 180-525° C., preferably in the range of 180-400° C., more preferred in the range of 180-300° C., and wherein at least one layer is a strength bearing layer being a high melting point metal with a melting point above the low melting point material, preferable at least 50° C. above.

The power cable comprises a conductor surrounded by an inner semi-conducting layer, an insulation layer and an outer semi-conducting layer. In one embodiment the outer semi-conducting layer forms the outer surface of the insulation system. In another embodiment heat protection is provided by a thermal shielding component as described in further detail below.

In one embodiment of the invention the cable core is a cross-linked polyethylene high voltage cable or a mass impregnated power cable.

For the low melting point layers following alloy systems are highly relevant. Some of these alloys includes lead, however the total amount of lead in a final power cable will be very low and thus within an environmentally acceptable amount.

Sn—Pb alloys
Sn—Pb—Cu alloys
Sn—Ag alloys
Cd—Zn—Ag alloys
Cd—Ag alloys
Bi—Sn alloys
Bi—In alloys The above systems all entail compositions with melting points below 400° C., and several below 300° C.

The alloys selected from the group consisting of Sn—Pb alloys, Sn—Pb—Cu alloys, Sn—Ag alloys, Cd—Zn—Ag alloys, Cd—Ag alloys, Bi—Sn alloys, or any alloy combining two or more of the elements Bi, Pb, Sn, Sb, Cu, Te, Cd, Ag, Au, and In can be used as the low melting point layer(s). It is understood that additional impurity levels might be present.

Table 1 below identifies some specific examples of such alloy systems.

TABLE 1

| Composition | Melting range [° C.] |
| --- | --- |
| $Sn_{50}Pb_{49}Cu_1$ | 183/215 |
| $Sn_{60}Pb_{40}Cu$ | 183/215 |
| $Sn_{97}Cu_3$ | 227/310 |
| $Sn_{50}Pb_{46}Ag_4$ | 178/210 |
| $Sn_{63}Pb_{35}Ag_2$ | 178 |

TABLE 1-continued

| Composition | Melting range [° C.] |
| --- | --- |
| $Sn_{96.3}Ag_{3.7}$ | 221/228 |
| $Sn_{97}Ag_3$ | 221/228 |
| $Sn_{95}Sb_5$ | 235/240 |
| $Au_{80}Sn_{20}$ | 280 |
| $Sn_{89}Zn_8Bi$ | 190/200 |

It is clear to the skilled person that a long range of alloys having melting point in the range of 180-525° C., preferably in the range of 180400° C., more preferred in the range of 180-300° C. are available and that the above material lists are not exhaustive.

In an embodiment of the invention the cable insulation can be protected by a thermal shielding component during the application and thermal treatment of the multilayered barrier. The shielding material has low thermal conductivity and/or high thermal emissivity while remaining thermal stability over the relevant temperature range. Such shielding components includes polyimide film such as Kapton®, stainless steel such as austentic SS304, copper tape with adhesive backing, ceramic non-woven or woven fiber sheets such as Alkaline Earth Silicate Ceramic Fiber with Aluminum Foil Facing, Alumina Oxide Ceramic Fiber or Calcium Aluminum Silicate Ceramic Fiber, or organic water/clay gel.

With the cable cord thermally protected, further material systems are available as low melting point layers. The low-melting point layer may be selected from one of the following alloying groups; Al—Si—Cu, Al—Zn, Cu—Mg, Cu—Pr, Cu—Te, Cu—Sn, Cu—Sn—B, Cu—Sn—Ni—B or any alloy combining two or more of the elements Al, Si, Cu, Zn, Mg, Pr, Te, Sn, B, Ni. Particularly the low-melting point layer consists of $AlSi_7Cu_{20}Sn_2Mg_1$, $CuMg_{70}$, $CuPr_{83}$, $CuTe_{82}$. It is understood that additional impurity levels might be present.

The above defined material systems are also applicable as low melting point layers in embodiments where the power cable core is not protected by a thermal shielding component.

The strength bearing layer is a metal or alloy layer having melting point at least 50° C., preferably at least 100° C. above the melting point of the low melting point layer. The material of the strength bearing layer is selected from the group consisting of steel, copper, copper alloys, aluminium and aluminium alloys.

Another aspect of the present invention concerns a method for manufacturing a cable core consisting of a conductor with insulating system or an insulated power cable with a multilayered barrier, comprising the steps of:

a) applying a multilayered tape with overlapping regions to the cable core or the cable by helically winding said tape around said core or cable in an in-line operation, b) heating the covered core or cable at a temperature above the low-melting point material and below the melting point of the strength bearing layer of the tape for a short period of time sufficient to melt the low melting layer(s) of the tape.

The heating in step b) may be provided by electromagnetic induction or laser wherein the heat source is arranged around the cable core. The cable core is fed through a chamber or house comprising a heat source configured to provide a temperature high enough to melt the low-melting point layer(s) material of the multilayered tape.

The melting of material with the lower melting point may be provided by an induction brazing process using induction heating. In induction heating materials are heated rapidly from the electromagnetic field created by the alternating current from an induction coil.

Laser beam heating is a technique where a metal or alloy is heated through the use of a laser. The laser beam provides a controllable and concentrated heat source that is capable of rapidly melting the lower melting point material. Such a laser beam heating can be adjusted and controlled by means known in the art.

Both induction and laser heat sources provide heating of the multi-layered tape to a temperature sufficient to melt the low-meting point layer of the tape in a short time period and the heat transfer to the insulation material in the cable core is thus limited.

The in-line thermal treatment should not increase the insulation temperature of the core cable or cable with more than 120° C. for long periods. Higher temperatures, 300-500° C. are acceptable for shorter time periods.

One embodiment of the method is illustrated in FIG. 6 where the cable core i.e. conductor and insulating system 11 is moved in the production direction 14 while the multilayered tape 13 is applied by helically winding the multilayered tape 13 around said cable core 11 and re-melting the low melting point by an orbital heat source 15 at a temperature above the low melting point temperature and below the melting point temperature of the strength bearing material such that overlapping regions 12 are obtained where the low melting point material have been re-melted.

A prefabricated multilayered tape is folded or helically winded around a cable core followed by a fine-tuned thermal treatment (in-line) where the low melting point layer is re-melt to produce a metallic and hermetic seal.

An advantage of prefabricating a metal-metal laminate is that the prefabrication process is not constrained by temperature limitations of the cable core. The prefabricated multi-layer tape can be made by hot- or cold rolling where the temperature could exceed the temperature restrictions when heating the multi-layered tape after winding on the cable core i.e. the time and temperature could exceed the restriction requirement where the temperature of an outer surface of the insulation system does not exceed 100-150° C. for more than 20 minutes or 300° C. for more than 10 minutes.

Alternatively, the multilayered tape could be developed from the individual materials where the low melting-point material is added in tandem with wrapping or folding of the strength bearing tape. The alternative method could potentially increase the flexibility in material selection it would however also set higher demands to the thermal treatment, and the method using prefabricated tapes are thus preferred.

In one preferred embodiment of the invention the temperature of an outer semi-conductive layer of the power cable insulation shall not exceed 100-150° C. for more than 20 minutes or 300° C. for more than 10 minutes.

One aspect of the invention relates to prefabricated multilayered metal-metal laminates for use as multilayered barrier in a method as disclosed above. The multilayered barrier may be composed of a metal-metal laminate tape comprised of one strength bearing layer and one low melting point layer or one strength bearing layer sandwiched between two low melting point layers. The multilayered tape comprises at least two layers whereof at least one of the layers has a low melting point in the range of 180-700° C., preferably in the range of 180-400° C., and whereof at least one layer is a strength bearing layer being a high melting point metal.

FIG. 7 shows cross-sections of multilayered tapes, wherein layer A is a low melting point metal or alloy, and B is a strength bearing layer.

The present invention provides a water barrier for high voltage subsea cables where the use of lead is strongly limited or eliminated. This solution holds other advantages over the current used lead barrier such as reduced weight and costs. The presented method can be implemented in existing manufacturing systems with minor adjustments and upgrades.

The invention claimed is:

1. A power cable comprising:
a cable core comprising at least one conductor with an insulating system;
a water barrier surrounding the cable core,
wherein the water barrier comprises a helically wound strength bearing layer with overlapping regions interconnected by a material with a lower melting point than the strength bearing layer,
wherein the water barrier is composed of a multilayered tape comprising at least one layer of a low-melting point material and a strength bearing layer, and
wherein the at least one of the layers of the multilayered tape having a low melting point, has a melting point in the range of 180-525° C., and wherein at least one layer is a strength bearing layer being a high melting point metal with a melting point above the low melting point material, and
wherein said overlapping regions of said water barrier are portions of said at least one of the layers of the multilayered tape with a low melting point re-melted to each other.

2. The power cable according to claim 1 wherein the strength bearing layer is a metal or metal alloy tape and the material with a lower melting point is a metal or a metal alloy.

3. The power cable according to claim 1 wherein the strength bearing layer is sandwiched between two low melting point layers.

4. The power cable according to claim 1 wherein the low melting point material is an alloy selected from the group consisting of Sn-Pb alloys, Sn-Pb-Cu alloys, Sn-Ag alloys, Cd-Zn-Ag alloys, Cd-Ag alloys, Bi-Sn alloys, Bi-In alloys or any alloy combining two or more of the elements Bi, Pb, Sn, Sb, Cu, Te, Cd, Ag, Au, and In.

5. The power cable according to claim 1 wherein the low melting point material is an alloy selected from the group consisting of $Sn_{50}Pb_{49}Cu_1$, $Sn_{60}Pb_{40}Cu$, $Sn_{97}Cu_3$, $Sn_{50}Pb_{46}Ag_4$, $Sn_{63}Pb_{35}Ag_2$, $Sn_{96.3}Ag_{3.7}$, $Sn_{97}Ag_3$, $Sn_{95}Sb_5$, $Au_{80}Sn_{20}$ and $Sn_{89}Zn_8Bi$.

6. The power cable according to claim 1 wherein the cable core further comprises a thermal shielding layer surrounding the insulation system for protecting the insulation system during the heating of the multilayered tape.

7. The power cable according to claim 6, wherein the thermal shielding layer component is selected from the group consisting of a polyimide film, stainless steel, copper tape with adhesive backing, ceramic non-woven or woven fiber sheets, Alumina Oxide Ceramic Fiber, Calcium Aluminum Silicate Ceramic Fiber, and organic water/clay gel.

8. The power cable according to claim 1 wherein the low-melting point layer is selected from one of the following alloying groups; Al—Si—Cu, Al—Zn, Cu—Mg, Cu—Pr, Cu—Te, Cu—Sn, Cu—Sn—B, Cu—Sn—Ni—B or any alloy combining two or more of the elements Al, Si, Cu, Zn, Mg, Pr, Te, Sn, B, Ni.

9. The power cable according to claim 8 wherein the low-melting point layer consists of $AlSi_7Cu_{20}Sn_2Mg_1$, $CuMg_{70}$, $CuPr_{83}$, $CuTe_{82}$.

10. The power cable according to claim 1, wherein the at least one of the layers that has a low melting point, has a melting point in the range of 180-400° C.

11. The power cable according to claim 1, wherein the high melting point metal has a melting point at least 50° C. above the low melting point material.

12. A method for providing a cable core with a multilayered barrier, comprising the steps of:
   a) applying a multilayered tape with overlapping regions to the cable core by helically winding said tape around said cable core, wherein the multilayered tape comprises at least one layer of a low-melting point material and a strength bearing layer,
      wherein the multilayered tape comprises at least two layers whereof at least one of the layers has a low melting point in the range of 180-525° C., and wherein at least one layer is a strength bearing layer being a high melting point metal with a melting point above the low melting point material,
   b) heating the winded multilayered tape to a temperature above the melting point of the low-melting point material and below the melting point of the strength bearing layer of the tape for a period of time sufficient to melt the low melting layer(s) of the multilayered tape such that said overlapping regions of said water barrier are portions of said at least one of the layers of the multilayered tape with a low melting point re-melted to each other.

13. The method according to claim 12 wherein the temperature of an outer surface of the insulation system does not exceed 100-150° C. for more than 20 minutes or 300° C. for more than 10 minutes.

14. A prefabricated multilayered metal-metal laminate for use as multilayered tape in a method according to claim 12, wherein the strength bearing layer is sandwiched between two low melting point layers.

15. A power cable comprising:
   a cable core comprising at least one conductor with an insulating system,
   a water barrier surrounding the cable core,
      wherein the water barrier comprises a helically wound strength bearing layer interconnected by a low melting point material wherein in that the power cable is manufactures by the method according to claim 12, and
      wherein the multilayered tape comprises at least two layers whereof at least one of the layers has a low melting point in the range of 180-525° C., and wherein at least one layer is a strength bearing layer being a high melting point metal with a melting point above the low melting point material.

16. The power cable according to claim 15, wherein the at least one of the layers that has a low melting point, has a melting point in the range of 180-400° C.

17. The power cable according to claim 15, wherein the high melting point metal has a melting point at least 50° C. above the low melting point material.

18. The method according to claim 12, wherein the at least one of the layers that has a low melting point, has a melting point in the range of 180-400° C.

19. The method according to claim 12, wherein the high melting point metal has a melting point at least 50° C. above the low melting point material.

* * * * *